(12) United States Patent
Holton et al.

(10) Patent No.: US 9,937,530 B2
(45) Date of Patent: Apr. 10, 2018

(54) SEAL WITH SUPPORT MEMBER

(71) Applicant: M-I LLC, Houston, TX (US)

(72) Inventors: Benjamin Holton, Covington, KY (US); John Fedders, Florence, KY (US)

(73) Assignee: M-I L.L.C., Houston, TX (US)

(*) Notice: Subject to any disclaimer, the term of this patent is extended or adjusted under 35 U.S.C. 154(b) by 0 days.

(21) Appl. No.: 14/889,412

(22) PCT Filed: May 9, 2014

(86) PCT No.: PCT/US2014/037581
§ 371 (c)(1),
(2) Date: Nov. 5, 2015

(87) PCT Pub. No.: WO2014/183086
PCT Pub. Date: Nov. 13, 2014

(65) Prior Publication Data
US 2016/0082479 A1    Mar. 24, 2016

Related U.S. Application Data

(60) Provisional application No. 61/821,636, filed on May 9, 2013.

(51) Int. Cl.
*B07B 1/46* (2006.01)
*E21B 21/06* (2006.01)
*B07B 1/28* (2006.01)
*F16J 15/10* (2006.01)

(52) U.S. Cl.
CPC .............. *B07B 1/46* (2013.01); *B07B 1/28* (2013.01); *E21B 21/065* (2013.01); *F16J 15/10* (2013.01); *B07B 2201/04* (2013.01)

(58) Field of Classification Search
CPC ........ F16J 15/121; F16J 15/122; F16J 15/128; F16J 15/06; F16J 15/061; F16J 15/10; F16J 15/104
See application file for complete search history.

(56) References Cited

U.S. PATENT DOCUMENTS

| 4,744,898 A * | 5/1988 | Bailey ............... B07B 1/48 209/399 |
| 4,846,352 A * | 7/1989 | Bailey ............... B07B 1/48 209/399 |
| 6,244,602 B1 * | 6/2001 | Farm ............... B01D 17/0214 210/511 |

(Continued)

*Primary Examiner* — Kristina R Fulton
*Assistant Examiner* — Lakshmi S Koneru
(74) *Attorney, Agent, or Firm* — David J. Smith

(57) ABSTRACT

This disclosure is generally drawn to systems, devices, apparatus, and/or methods related to sealing mechanisms for vibratory separators. Specifically, the disclosed systems, devices, apparatus, and/or methods relate to seals having support(s) for improved installation in and/or removal from a vibratory separator. In some examples, an apparatus may include a seal and a support member. The seal may have two opposing side members and an end member coupled to and extending between the two opposing side members. The support member, which is at least partially rigid, may be coupled to the end member of the seal. In some examples, the support member may be integrated with or removably coupled to the seal.

14 Claims, 10 Drawing Sheets

(56) References Cited

U.S. PATENT DOCUMENTS

| | | | |
|---|---|---|---|
| 6,955,262 B2* | 10/2005 | Seyffert | B01D 33/0376 209/319 |
| 2004/0074816 A1* | 4/2004 | Seyffert | B01D 33/0376 209/363 |
| 2005/0000865 A1* | 1/2005 | Schulte, Jr. | B01D 29/012 209/403 |
| 2005/0035033 A1* | 2/2005 | Adams | B01D 29/012 209/392 |
| 2005/0103689 A1* | 5/2005 | Schulte, Jr. | B01D 33/0376 209/405 |
| 2005/0224398 A1* | 10/2005 | Largent | B01D 33/0376 209/403 |
| 2010/0236995 A1* | 9/2010 | Carr | B07B 1/46 209/365.1 |

* cited by examiner

SEAL WITH SUPPORT MEMBER

BACKGROUND

The present disclosure contemplates that many applications require that machine components to be secured to a machine, whether temporarily or permanently. Some examples of this include water treatment applications, hazardous material handling applications, and drilling applications. For example, in oilfield environments, fluid used in oilfield activities must be filtered via a screening process. Failure to keep solids out of the drilling fluid could mean diminished rate of penetration, equipment damage, non-productive time, and higher costs. Further, efficient screening reduces the time required to filter the fluid. Increased fluid capacity of screens allows the filtering process to complete quickly.

The present disclosure further contemplates that one mechanism for separating the contaminants and/or undesirable objects from drilling fluid are screen assemblies in vibratory separators (e.g., shale shakers). Some screen assemblies are held in place by a sealing mechanism. The screen assemblies filter contaminants and/or undesirable objects from the drilling fluid as the vibratory separator vibrates.

Over time, solids from the drilling fluid may collect or build up on a surface of the screen assembly. The solids build-up may prevent the screen from being properly seated and/or aligned in the vibratory separator. Accordingly, there exists a need for a mechanism to secure a screen in a vibratory separator that reduces the build-up of solids in its tracks.

The present disclosure also contemplates that some conventional systems utilize bladders (e.g., pneumatic, water, air, gas, liquid, oil) to secure screen assemblies in a vibratory separator. A fluid media such as air, water, or any similar item is pumped into the bladder causing the bladder to expand and press down on the screen assemblies. This method of clamping allows for a method of changing screens quickly and without tools, increasing the safety of operating the vibratory separator.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

In the drawings.

DETAILED DESCRIPTION

Figure 1:
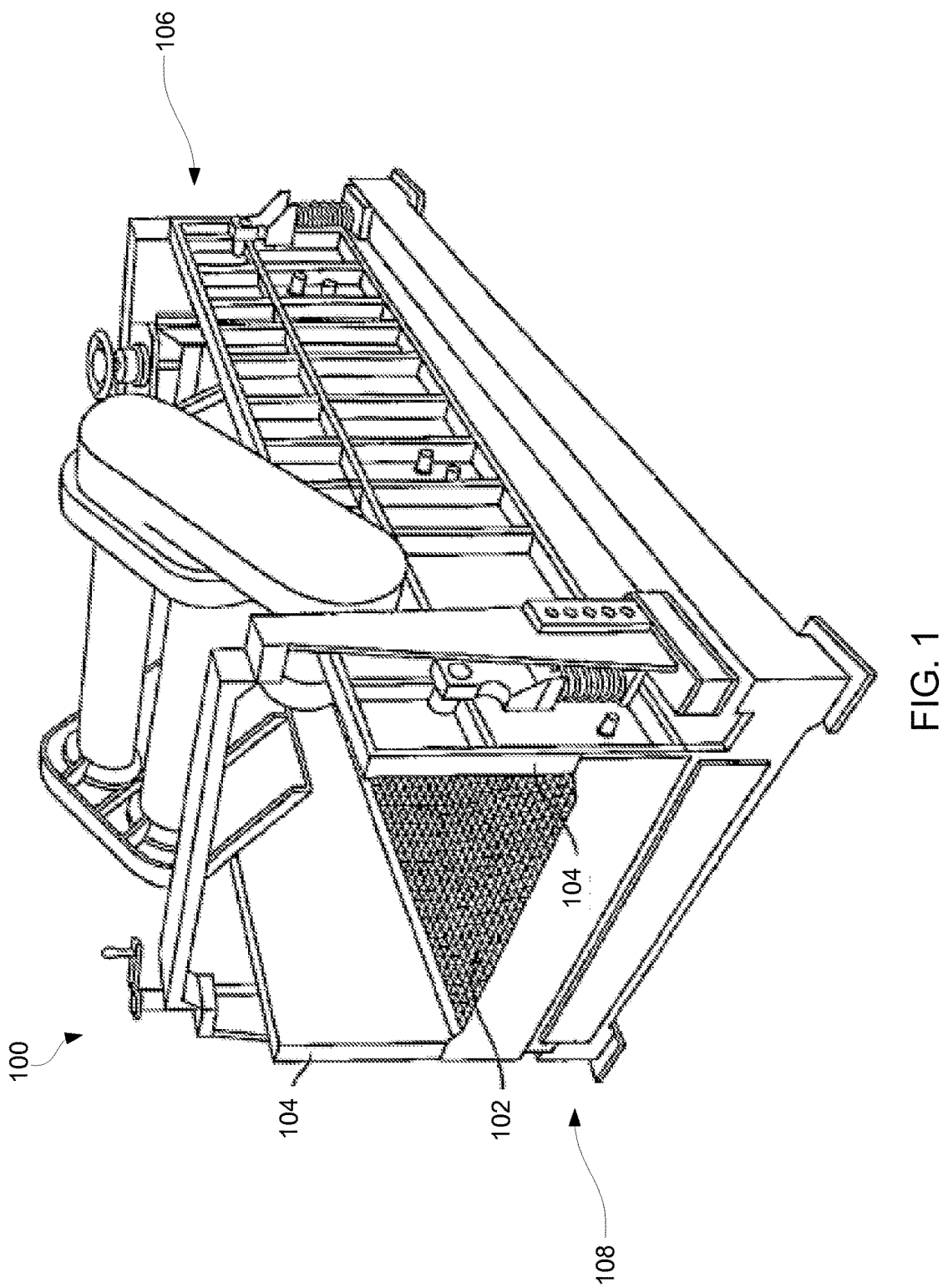
FIG. 1 depicts a perspective view of an example vibratory separator.

In the following detailed description, reference is made to the accompanying drawings, which form a part hereof. In the drawings, similar symbols typically identify similar components, unless context dictates otherwise. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is generally drawn to systems, devices, apparatus, and/or methods related to sealing mechanisms for vibratory separators. Specifically, the disclosed systems, devices, apparatus, and/or methods relate to seals having support(s) for improved installation in and/or removal from a vibratory separator.

FIG. 1 depicts an example vibratory separator 100. An example vibratory separator 100 may be a vibratory shaker used in the oilfield industry to process wellbore fluids. A screen 102 or screens may be detachably secured to the vibratory separator 100. Drilling fluid, along with drill cuttings and debris, may be deposited on top of the screen 102 at one end (i.e., the feed end 106). The screen 102 may be vibrated (e.g., 25-40 Hz frequency range) by a motor or motors for the purpose of screening or separating the drilling fluid on screen 102. The liquid and fine particles of the drilling fluid may pass through the screen 102 by force of gravity and acceleration caused by the motor and may be recovered underneath the screen 102. Solid particles greater than a certain size may migrate and vibrate across the screen 102 where they may be discharged (i.e., at the discharge end 108). The screen 102 may include filtering elements, such as mesh, attached to a screen frame. The filtering elements may further define the largest solid particle capable of passing therethrough.

Figure 2:
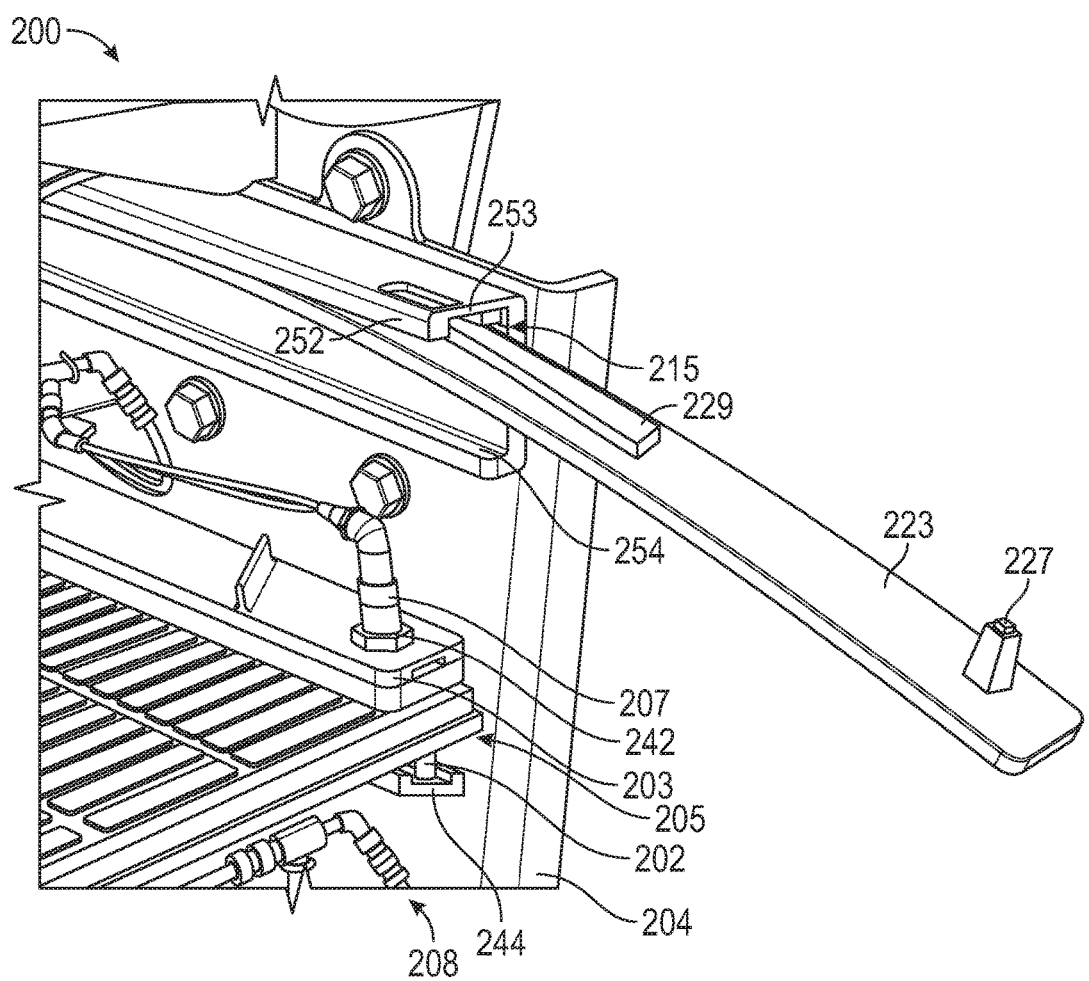
FIG. 2 depicts a perspective view of a seal installed in a vibratory separator and a seal partially installed in the same vibratory separator.

FIG. 2 depicts a seal 203 installed in a vibratory separator 200 and a seal 223 partially installed in the vibratory separator 200, in accordance with at least one embodiment of the present disclosure. FIG. 2 shows a view from a discharge end 208 of the vibratory separator 200. Example vibratory separator 200 may be a multi-level vibratory separator 200 having multiple decks or screens. FIG. 2 depicts two levels—one level with a screen 202 installed and one level with no screen installed. FIG. 2 shows only one sidewall 204. The sidewall 204 may include two tracks 205, 215 for receiving screens and seals. Track 205 (i.e., the lower track 205 in FIG. 2) may receive screen 202 and seal 203. The track 205 may be defined an upper retainer 242 and a lower retainer 244, which may both be coupled to the sidewall 204. The screen 202 and seal 203 may be inserted into the track 205 between the upper retainer 242 and the lower retainer 244. Track 215 (i.e., the higher track 215 in FIG. 2) may receive a screen and seal 223. The track 215 may be defined by an upper retainer 252 and a lower retainer 254, which may both be coupled to the sidewall 204. The screen and seal 223 may be inserted into the track 215 between the upper retainer 252 and the lower retainer 254. The tracks 205, 215 may be substantially continuous along the entire length of vibratory separator 200. In some examples, tracks 205, 215 may be angled and/or beveled and may match a shape of the screen 202.

The lower track 205 of vibratory separator 200 may include an upper retainer 242 and a lower retainer 244. The upper retainer 242 may include a slot for receiving a portion of the seal 203. In some examples, the portion of the seal 203 that may engage the slot of the upper retainer may be a dovetail, a half-round continuous toggle, and/or a T-slot geometry, or other similar shape and geometry. The portion of the seal 203 may be inserted into the slot from the discharge end 208 of the vibratory separator 200. From the discharge end 208, an operator may slide the seal 203 toward the feed end of the vibratory separator 200. The seal 203 may be located between a bottom surface of the upper retainer 242 and a top surface of the screen 202. In this manner, the seal 203 may act to retain and/or secure the screen 202 in place.

In some examples, the seal 203 may be a bladder (e.g., pneumatic, water, air, gas, liquid, oil) such that the bladder may be inflated and/or deflated. When inflated, the bladder may secure the screen 202 in place. When deflated, the bladder may not restrict movement of the screen 202. A fluid media such as air, water, or any similar item may be inputted or pumped into the bladder via a nozzle 207, causing the bladder to expand and press down on the screen 202. As fluid is inputted or pumped into the bladder, the bladder expands. Because the bladder is restrained by the upper retainer 242 above, the bladder's expansion forces the bladder downward onto the screen 202. In this manner, the screen 202 is clamped and/or pinned in place between the bladder and the lower retainer 244. This restricts movement of the screen 202 along the length of the lower track 205.

The higher track 215 of the vibratory separator 200 may include an upper retainer 252 and a lower retainer 254. The upper retainer 252 may include a slot 253 for receiving a portion 229 of the seal 223. In some examples, the portion 229 of the seal 203 that may engage the slot 253 of the upper retainer 254 may be a dovetail, a half-round continuous toggle, and/or a T-slot geometry, or other similar shape and geometry. The portion 229 of the seal 223 may be inserted into the slot from the discharge end 208 of the vibratory separator 200. From the discharge end 208, an operator may slide the seal 223 toward the feed end of the vibratory separator 200. The seal 223 may be located between a bottom surface of the upper retainer 252 and a top surface of the screen. In this manner, the seal 223 may act to retain and/or secure the screen in place.

In some examples, the seal 223 may be a bladder (e.g., pneumatic, water, air, gas, liquid, oil) such that the bladder may be inflated and/or deflated. When inflated, the bladder may secure screen in place. When deflated, the bladder may not restrict movement of the screen. A fluid media such as air, water, or any similar item may be input or pumped into the bladder via a nozzle 227, causing the bladder to expand and press down on screen. As fluid is inputted or pumped into the bladder, the bladder expands. Because the bladder is restrained by the upper retainer 252 above, the bladder's expansion forces the bladder downward onto the screen. In this manner, the screen is clamped and/or pinned in place between the bladder and the lower retainer 254. This restricts movement of the screen along the length of the higher track 215.

In some examples, the seals 203, 223 may be an inflatable seal (e.g., bladder), elastomer seal, or other seals known to those skilled in the art. The seals 203, 223 may be provided to prevent or reduce debris or fluid from bypassing the screen(s) 202. In some embodiments, the seals 203, 223 may assist in securing the screen(s) 202 with track(s) (e.g., lower track 205, upper track 215, single track).

Figure 3:
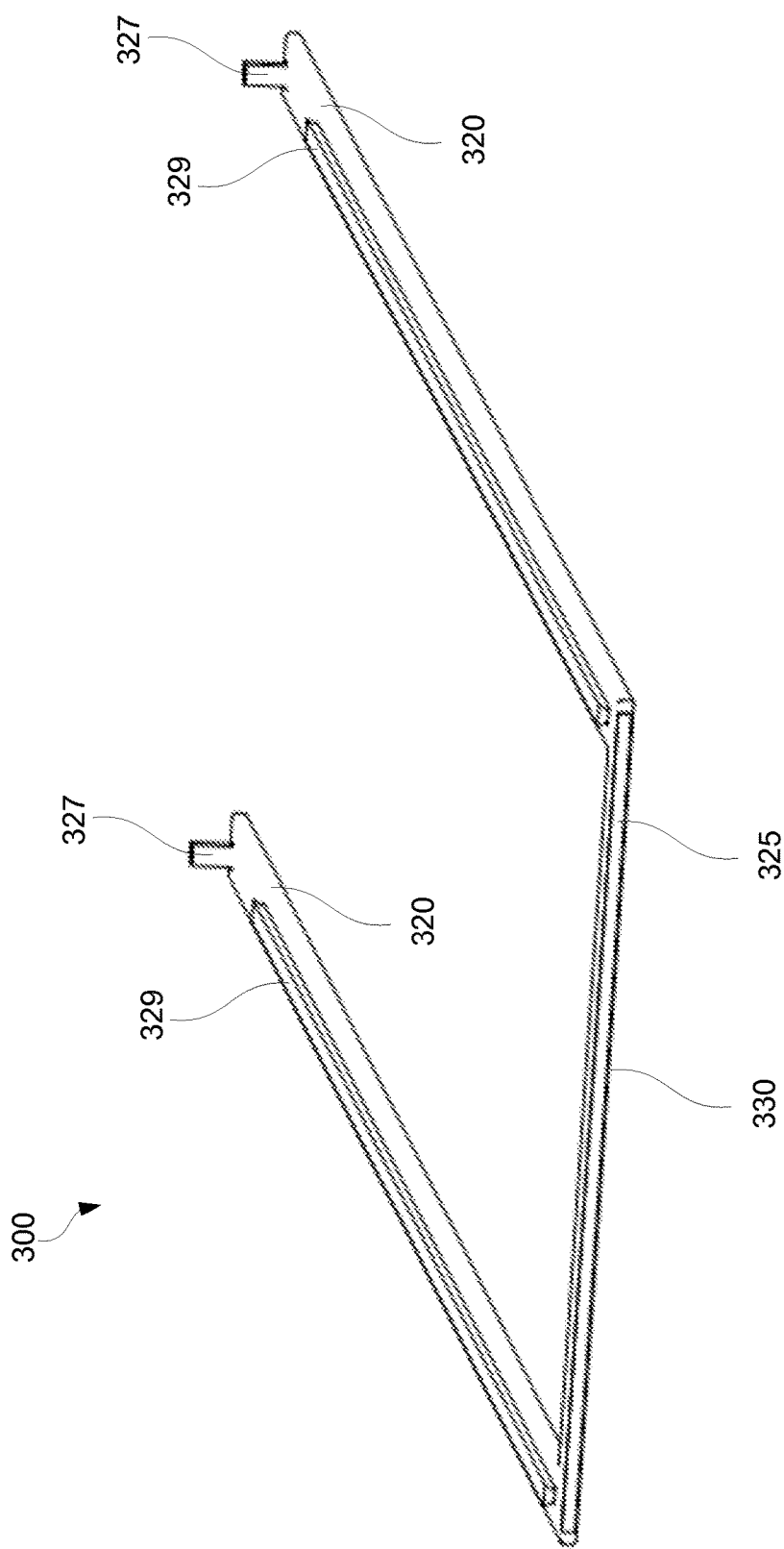
FIG. 3 depicts a perspective view of an example seal.

FIG. 3 depicts an example seal 300, in accordance with at least one embodiment of the present disclosure. The seal 300 may include a bladder (e.g., a U-shaped bladder) and a support member 325 coupled thereto. The seal 300 may include two side members 320 coupled via an end member 330.

The two side members 320 may be opposing members that are substantially parallel. The two side members 320 may have a length that is substantially the same as the length of a track of the vibratory separator (e.g., from the discharge end to the feed end) of the vibratory separator. The side members 320 may include a dovetail 329, half-round continuous toggle, and/or T-slot geometry, or the like to attach to a track of the vibratory separator.

The end member 330 may be coupled to and may extend between the two side members 320. The end member 330 may be coupled to the side members 320 at or near the ends of the side members 320. For example, the end member 330 may be coupled to the side members 320 at the ends of the side members 320 nearest the discharge end of the vibratory separator.

The support member 325 may be at least partially rigid to provide support to the end member 330. The support member 325 may provide enough rigidity to the seal 300 to provide for improved installation and/or removal of the seal 300 into and out of a vibratory separator at its discharge end. Conventionally, seals are difficult to install from the discharge end because the end member sags and prevents proper installation of the screens.

The support member 325 may be sufficiently rigid such that the seal 300 may be supported along the length of the end member 330. Because the support member 325 may be coupled to the end member 330, the rigidity of the support member 325 may provide structural support to the end member 330. This structural support may prevent and/or reduce sagging of the end member 330. In this manner, the seal 300 may be installed from the discharge end of a vibratory separator without being impeded due to sagging of the end member 330. The support member 325 may be metal (e.g., stainless steel), plastic (e.g., polypropylene), composite (e.g., plastic composite, rubber composite, urethane and metal), and/or any other material that would provide rigidity to and/or improve the existing rigidity of the end member 330.

The support member 325 may be coupled to the seal 300 in many ways. For example, the support member 325 may be coupled to the seal 300 via bonding, molding, and/or fastening the support member 325.

In some examples, the support member 325 may be bonded to the end member 330. Bonding may include adhesive bonding, rubber vulcanization, and/or other bonding techniques. The support member 325 may be separately manufactured from the end member 330 and they may be thereafter bonded to each other.

In some examples, the support member 325 may be molded with and/or to the end member 330. Molding may include molding the end member 330 and the support member 325 together via a molding process. In some examples, the support member 325 may be molded to the outside of the end member 330. In some examples, the support member 325 may be molded inside the end member 330. For example, the support member 325 may be inside a portion of the seal 300, such as a rubber bladder portion.

In some examples, the support member 325 may be fastened to the end member 330. Fastening may include the use of fasteners, such as mechanical fasteners, for example. The support member 325 may be separately manufactured from the end member 330 and they may be thereafter fastened to each other using the mechanical fasteners.

Further, the side members 320 may also include a nozzle 327 near the discharge end that may receive a fluid media that may cause the seal 300 to expand and press down on screen. Similarly, fluid media may be expelled from the seal 300 via the nozzle 327 to reduce the downward pressure on screen, thus effectuating removal of the screen.

Figure 4:
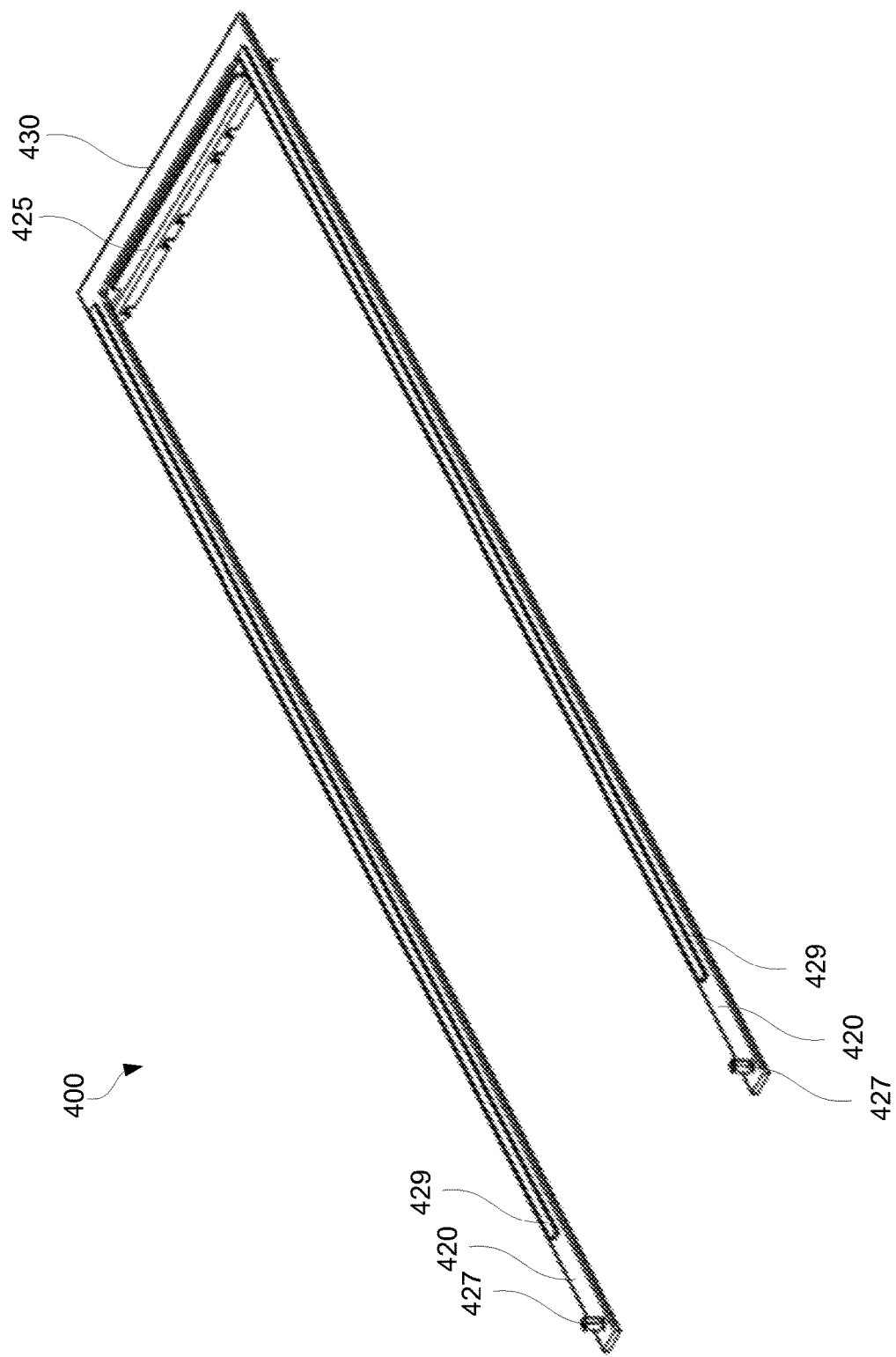
FIG. 4 depicts a perspective view of another example seal.

FIG. 4 depicts another example seal 400, in accordance with at least one embodiment of the present disclosure. Example seal 400 may include a substantially U-shaped seal such as a U-shaped bladder and a support member 425 coupled thereto.

In some examples, the support member 425 may be a support bracket distinct from the seal 400 such that the support bracket and the seal 400 are separable components and may be separated. During installation of the seal 400, the support member 425 (e.g., support bracket) may be positioned near and/or into a track at the discharge end of a vibratory separator. The seal 400 may then be positioned onto the support member 425 within the track. The seal 400 and the support member 425 may be slid into the track at the discharge end until at least a portion of the support member 425 makes contact with an inside wall of the vibratory separator at the feed end. In some examples, the seal 400 may engage an upper retainer of the track via the dovetail 429 or the like. The seal 400 may then provide a downward force on a screen (which was thereafter installed in the vibratory separator). In some examples, the seal 400 may be inflated via the nozzle 427.

In some examples, the support member 425 may be a support bracket that is integrated with the seal 400 such that support bracket and the seal 400 are not separable components. During installation of the seal 400, the end member 430 may be positioned near and/or into a track at the discharge end of a vibratory separator. The seal 400 with the support member 425 may be slid into the track at the discharge end until at least a portion of the end member 420 and/or the support member 425 makes contact with an inside wall of the vibratory separator at the feed end. In some examples, the seal 400 may engage an upper retainer of the track via the dovetail 429 or the like. The seal 400 may then provide a downward force on a screen (which was thereafter installed in the vibratory separator). In some examples, the seal 400 may be inflated via a nozzle 427.

FIGS. 5-10 depict several views of an example seal in various states of installation in and/or removal from a vibratory separator, each in accordance with at least one embodiment of the present disclosure.

Figure 5:
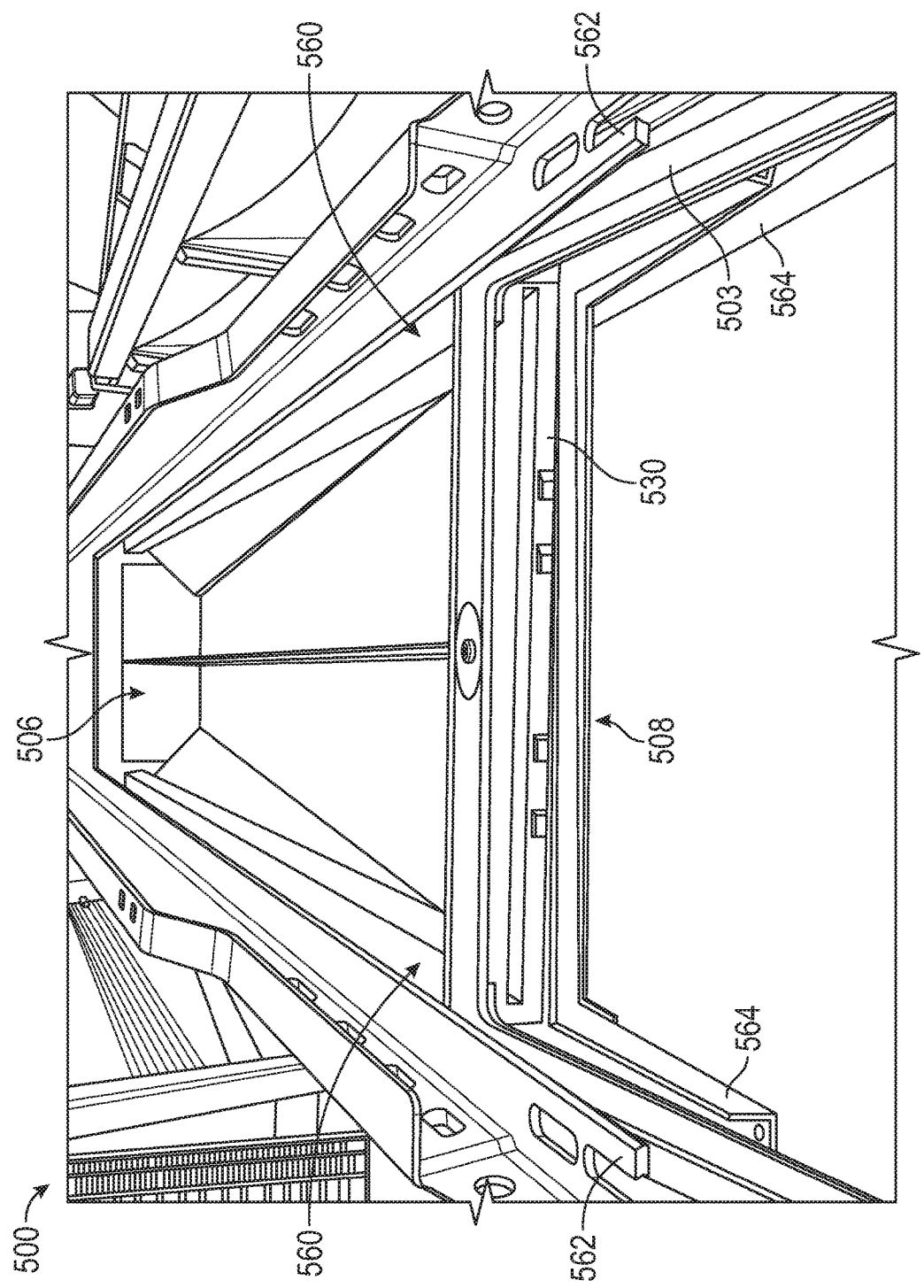
FIGS. 5-10 depict several views of an example seal in various states of installation in and/or removal from a vibratory separator; each arranged in accordance with at least some of the embodiments disclosed in the present disclosure.

FIG. 5 shows a vibratory separator 500 having tracks 560 on opposed sidewalls, each track 560 being defined by an upper retainer 562 and a lower retainer 564. An example seal 503 is shown being installed from and into the discharge end 508 of vibratory separator 500. A dovetail portion on an upper surface of the seal 503 is engaged with a dovetail slot in the upper retainer 562. In this manner, a section of the seal 503 is within the tracks 560. Standing near the discharge end 508 of the vibratory separator 500, an operator of the vibratory separator 500 may slide the seal 503 from the discharge end 508 toward the feed end 506. For removal of the seal 503 from vibratory separator 500, an operator standing near the discharge end 508 may slide the seal 503 from the discharge end 508 away from the feed end 506.

Figure 6:
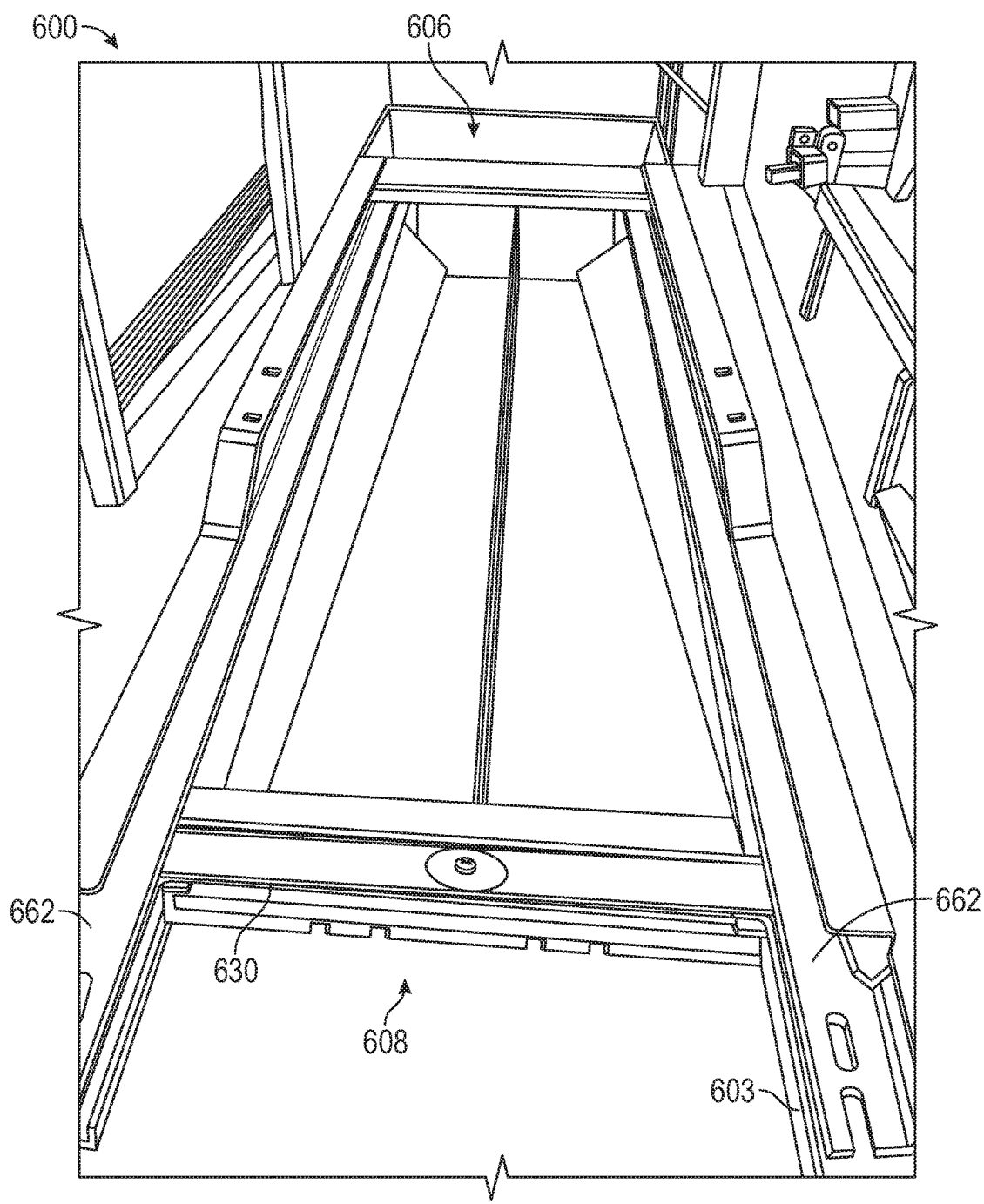

FIG. 6 shows another example seal 603 being installed onto and/or removed from a vibratory separator 600. From the discharge end 608 of the vibratory separator 600, the seal 603 may be slid toward and/or away from the feed end 606. A dovetail portion on an upper surface of the seal 603 is engaged with a dovetail slot in the upper retainer 662.

Figure 7:
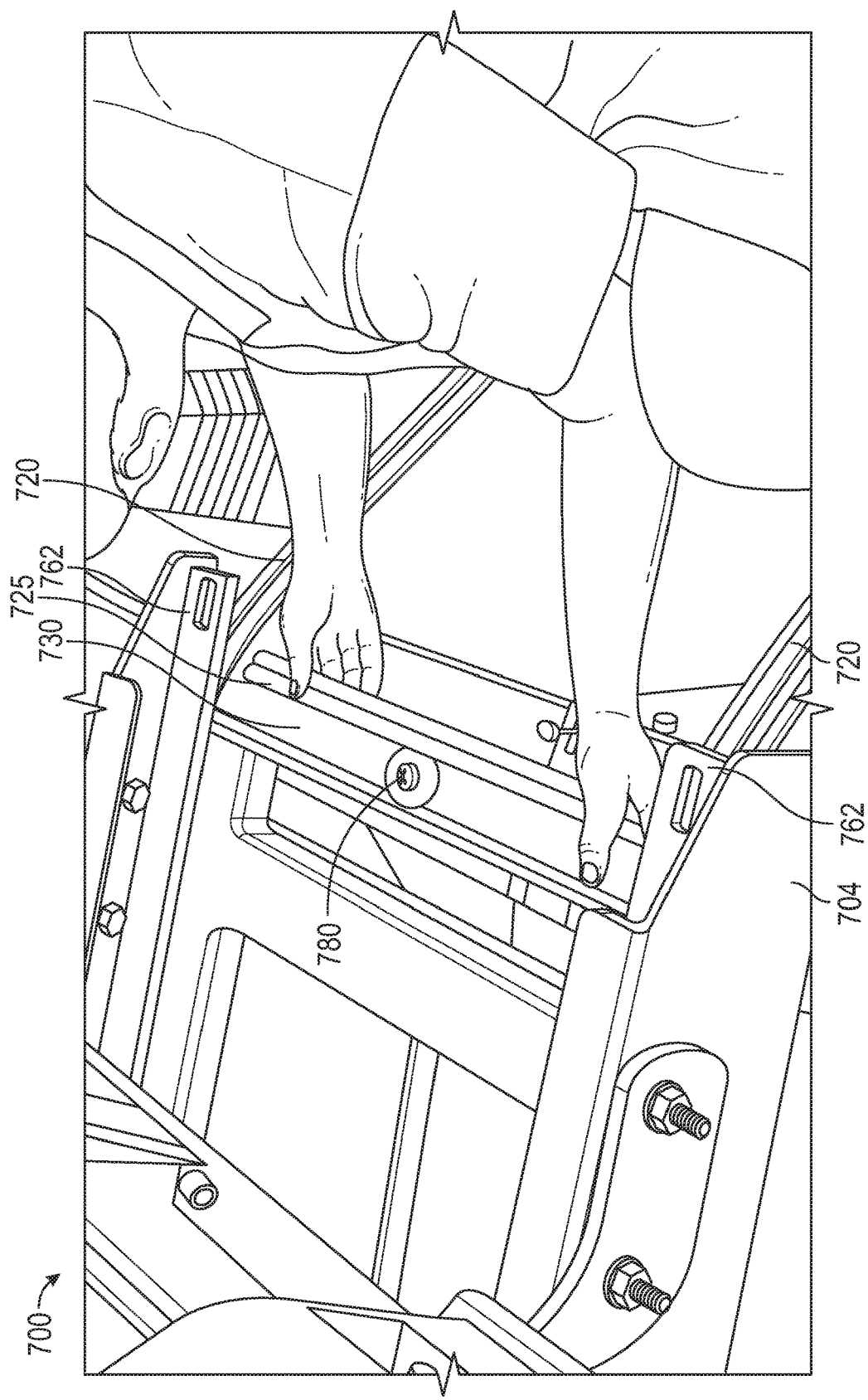

FIG. 7 shows yet another example seal being installed into and/or removed from a vibratory separator 700. In this example, a seal includes side members 720 and an end member 730. Some examples may include a support member 725 that is distinct from and not permanently coupled to the end member 730. Some examples may include a support member 725 that is coupled to the end member 730. The support member 725 may be a support bracket.

The support member 725 may be positioned within the track (defined by the upper retainer 762 and a lower retainer). The end member 730 may be inserted into and/or engaged with the support member 725 such that the support member 725 and the seal may slide together within the track. In some examples, the support member 725 may have a groove extending the length of the support member 725. This groove may receive the end member 730, allowing the support member 725 and the seal to move as one component. In this manner, the support member 725 and the seal may act as one component even though they are distinct components. The end member 730 may be removed from the support member 725 by disengaging the end member 730 from the groove.

An operator is shown near the discharge end sliding the support member 725 and the seal from the discharge end toward the feed end. As the end member 730 moves toward the feed end, the operator may hold the side member(s) 720 to continue sliding the support member 725 and seal toward the feed end. For removal of the seal from the vibratory separator 700, the operator may reverse this process.

The seal may include one or more toggles 780 for engagement with an interior shelf and/or interior wall near the feed end of the vibratory separator 700. Some example toggles 780 may be coupled to or integrated with the end member 730. Some example toggles 780 may be coupled to or integrated with the support member 730. In some examples, an interior shelf and/or interior wall near the feed end of the vibratory separator 700 may include a notch and/or slot for each respective toggle 780. The toggle(s) 780 may engage the notch and/or slots. In this manner, the seal may be coupled (at least temporarily) to the interior shelf and/or interior wall near the feed end of the vibratory separator 700. This may reduce sagging of the end member 730 and/or the support member 725 and provide additional rigidity to the seal.

In some examples, the support member 725 may interface with screen-to-seal designs. The support member 725 may be removable from the discharge end of vibratory separator 700 without tools. The support member 725 may have a latch geometry that corresponds to the latch geometry of screens. In this manner, a screen may be removed from the vibratory separator 700 and inserted backward so that the latch geometry of the screens may engage the support member 725 when the support member 725 is positioned in the vibratory separator 700. The screens may then act as a handle or tool, from the discharge end, for sliding the support member 725 and the corresponding seal toward and/or away from the feed end.

Figure 8:
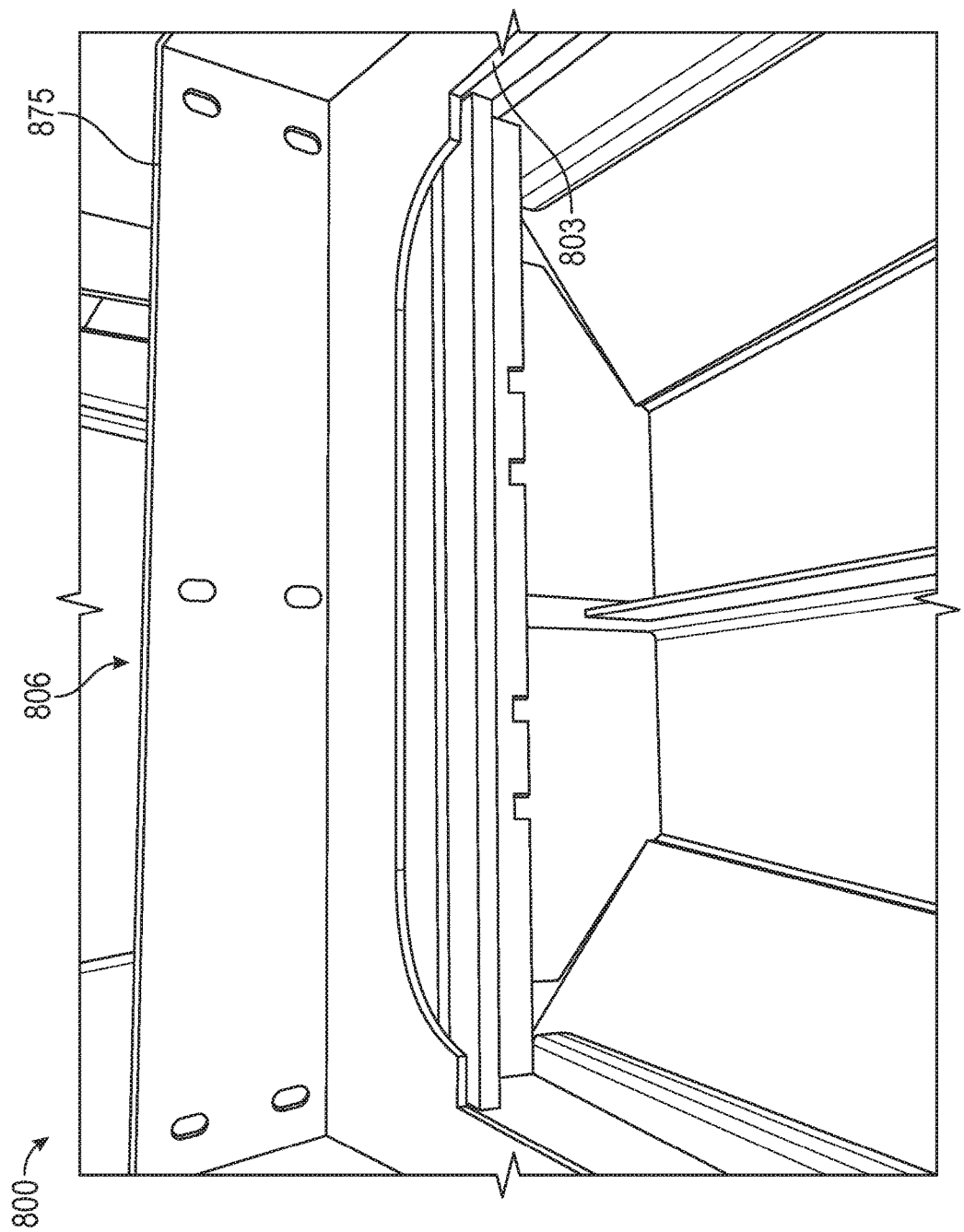
Figure 9:
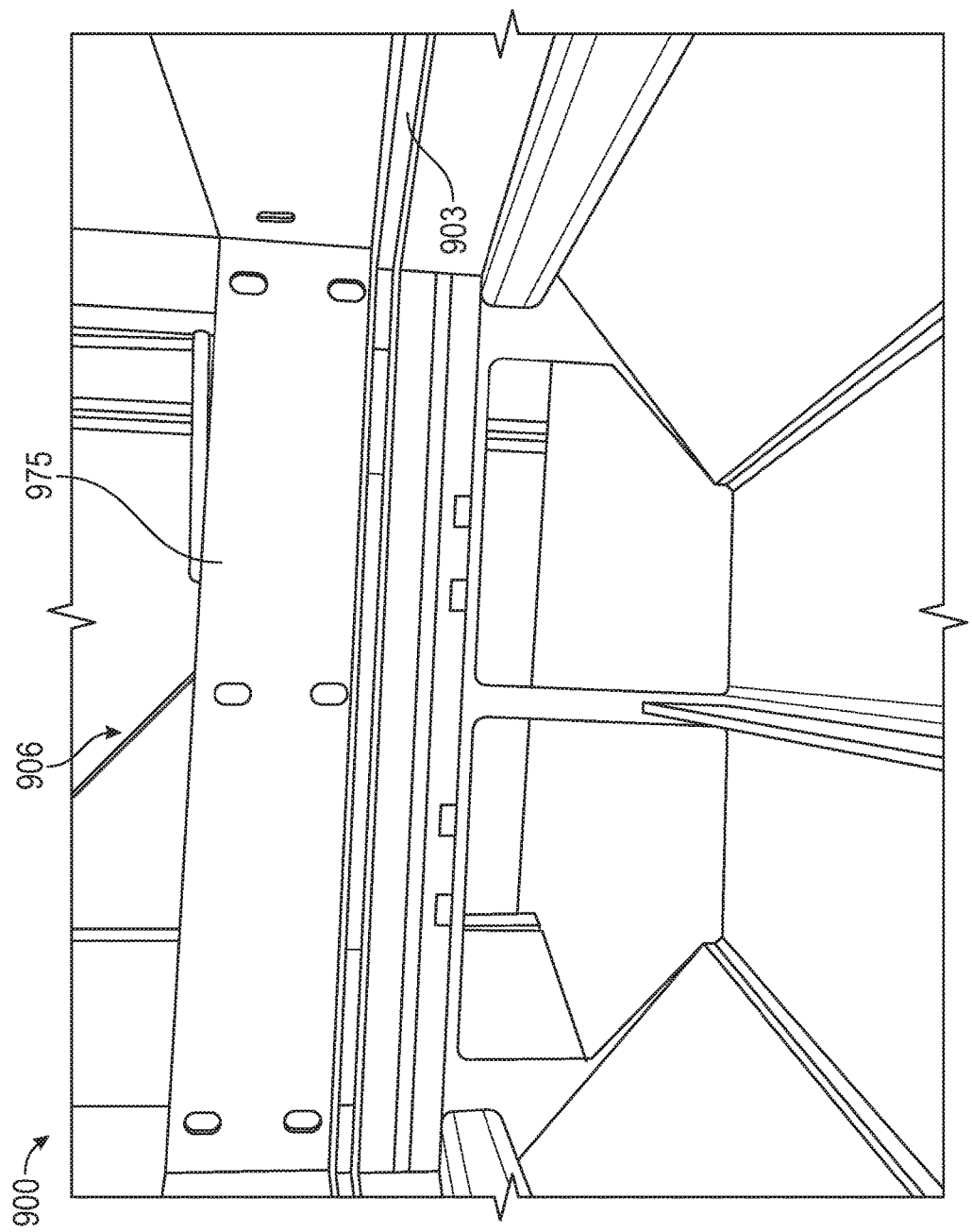

FIGS. 8 and 9 are close-up views of example seals 803, 903 installed in vibratory separators 800, 900, respectively. An end member and/or support member of the example seals 803, 903 are in contact with and/or near a wall 875, 975 at the feed end 806, 906 of the vibratory separators 800, 900, respectively.

Figure 10:
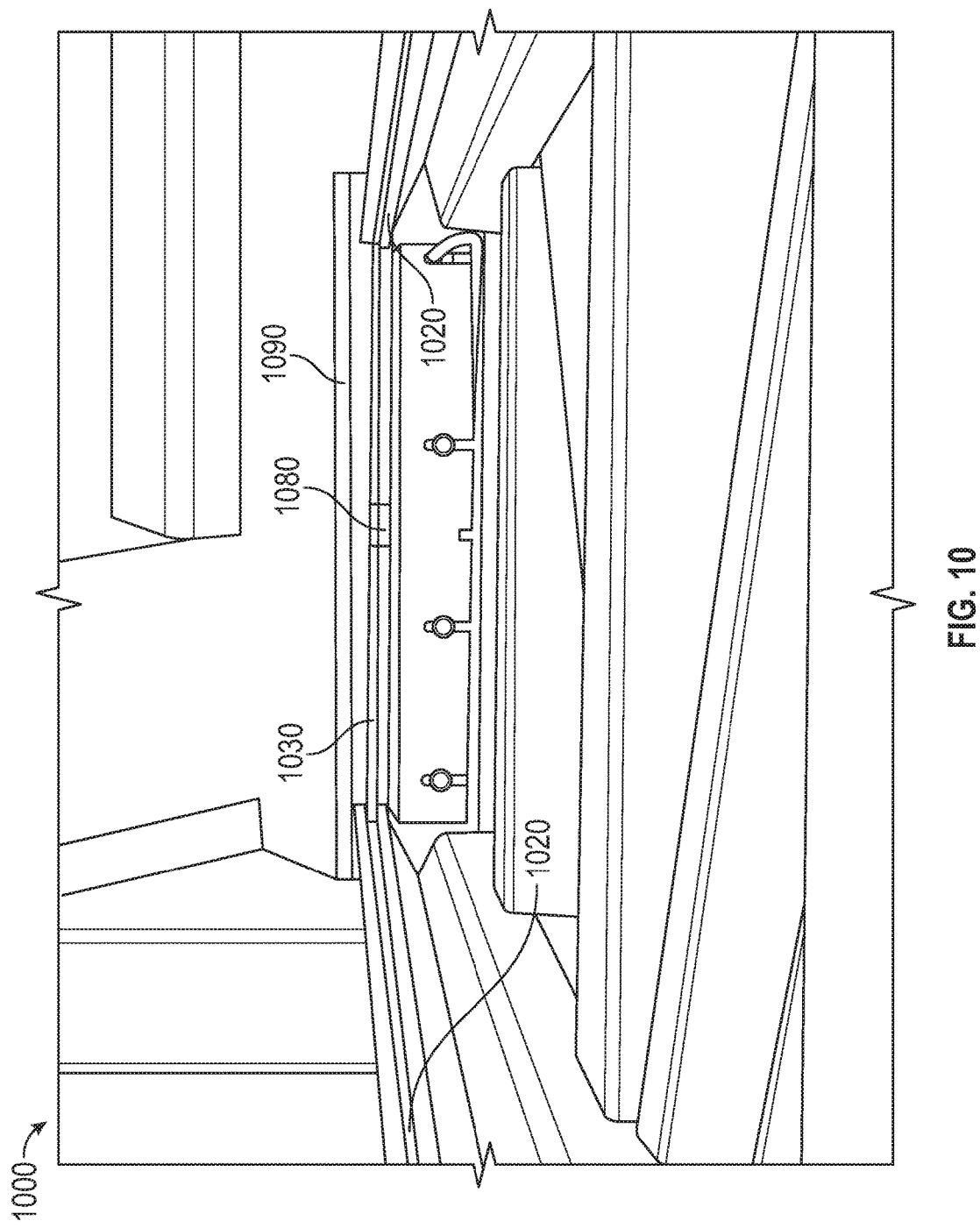

FIG. 10 shows yet another example seal installed in a vibratory separator 1000. The side members 1020 of the seal are engaged within the tracks, and the end member 1030 may be in contact with a wall at the feed end of the vibratory separator 1000. End member 1030 includes a toggle 1080 for engagement with a slot in a shelf 1090 near the feed end of the vibratory separator 1000. In some examples, the end member may include multiple toggles 1080. In this manner, the side members 1020 may be engaged with the tracks (e.g., dovetail) and the end member 1030 may be engaged with the feed end via engagement of the toggle(s) 1080.

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. An apparatus, comprising:
    a seal having two opposing side members and an end member coupled to and extending between the two opposing side members, wherein a portion of the seal extends outwardly away from an upper surface of the seal and has a geometry sized and shaped for sliding along a track of a vibratory separator; and
    a support member coupled to the end member of the seal, the support member having greater rigidity than the two opposing side members.

2. The apparatus of claim 1, wherein the support member is at least one of:
    integrally formed with the end member of the seal;
    permanently coupled to the end member of the seal; and
    removably coupled to the end member of the seal.

3. The apparatus of claim 1, wherein the support member is at least one of internal to the end member and external to the end member.

4. The apparatus of claim 1, wherein the support member is coupled to the end member of the seal via at least one of bonding, molding, and/or mechanical fastening.

5. The apparatus of claim 1, wherein the support member includes a groove in which at least a portion of the end member may engage.

6. The apparatus of claim 1, wherein the seal includes at least one toggle extending above the end member or at least one toggle is coupled to or integrated with the support member, the at least one toggle adapted to engage and/or couple with an interior portion of a vibratory separator.

7. The apparatus of claim 1, wherein the support member includes at least one of a metal, a plastic, and a composite.

8. The apparatus of claim 1 wherein the seal is an inflatable bladder.

9. The apparatus of claim 8, wherein the inflatable bladder is a U-shaped inflatable bladder.

10. The apparatus of claim 1, wherein the geometry of the portion of the seal is a dovetail, a half-round continuous toggle or a T-slot geometry.

11. The apparatus of claim 1, further comprising:
    at least one nozzle provided at or along at least one side member of the two opposing side members.

12. An apparatus, comprising:
    an inflatable U-shaped seal having two opposing side members and an end member coupled to and extending between the two opposing side members, wherein a top portion of the seal has a geometry sized and shaped for sliding along a track of a vibratory separator; and
    a support member coupled to the end member of the seal, the support member having greater rigidity than the two opposing side members.

13. An apparatus, comprising:
    a seal having two opposing side members and an end member coupled to and extending between the two opposing side members, wherein a top portion of the seal has a geometry sized and shaped for sliding along a track of a vibratory separator, each opposing side member has a total length defined between a first end and a second end opposite with respect to the first end, the end member connects the first ends of the two opposing side member and second ends of the two opposing side members are separated from each other; and
    a support member coupled to the end member of the seal, the support member having greater rigidity than the two opposing side members.

14. The apparatus of claim 12, wherein the seal is an inflatable U-shaped seal.

* * * * *